(12) United States Patent
Kawamata

(10) Patent No.: US 12,025,212 B2
(45) Date of Patent: Jul. 2, 2024

(54) DIFFERENTIAL GEAR UNIT

(71) Applicant: TOYOTA JIDOSHA KABUSHIKI KAISHA, Toyota (JP)

(72) Inventor: Atsushi Kawamata, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/483,565

(22) Filed: Oct. 10, 2023

(65) Prior Publication Data
US 2024/0167552 A1 May 23, 2024

(30) Foreign Application Priority Data
Nov. 17, 2022 (JP) .................................. 2022-184120

(51) Int. Cl.
| | | |
|---|---|---|
| *F16H 48/08* | (2006.01) | |
| *F16H 48/22* | (2006.01) | |
| *F16H 48/40* | (2012.01) | |
| *F16H 48/38* | (2012.01) | |

(52) U.S. Cl.
CPC ............ *F16H 48/22* (2013.01); *F16H 48/08* (2013.01); *F16H 48/40* (2013.01); *F16H 2048/382* (2013.01)

(58) Field of Classification Search
CPC .... F16H 48/22; F16H 48/08; F16H 2048/382; F16H 48/40; F16D 7/02; F16D 7/028
USPC ....... 475/231, 220, 230, 248; 74/606 R, 411, 74/435, 439; 192/56.1; 464/30, 46
See application file for complete search history.

(56) References Cited

U.S. PATENT DOCUMENTS

| | | | | |
|---|---|---|---|---|
| 3,499,349 | A | * | 3/1970 | Hausinger ............... F16H 48/22 475/240 |
| 6,056,101 | A | * | 5/2000 | Kataoka ................... B66D 1/58 192/56.6 |
| 2018/0172131 | A1 | * | 6/2018 | Bojanowski ........... F16H 48/40 |
| 2018/0180105 | A1 | * | 6/2018 | Lee ....................... F16D 13/644 |
| 2021/0079993 | A1 | * | 3/2021 | Ono ..................... B23K 26/242 |

FOREIGN PATENT DOCUMENTS

JP 2018-91449 A 6/2018

* cited by examiner

*Primary Examiner* — Roger L Pang
(74) *Attorney, Agent, or Firm* — Oblon, McClelland, Maier & Neustadt, L.L.P.

(57) ABSTRACT

A downsized differential gear unit designed to prevent transmission of an excessive torque. The differential gear unit comprises: a differential mechanism held in a casing; a ring gear mounted rotatably and reciprocatably on the casing; a friction mechanism that is arranged between the ring gear and the casing; and an elastic member that pushes the ring gear in an axial direction. A torque possible to be transmitted between the ring gear and the casing is set to a torque governed by a pushing force of the elastic member and the frictional force of the friction mechanism.

8 Claims, 3 Drawing Sheets

DIFFERENTIAL GEAR UNIT

CROSS REFERENCE TO RELATED APPLICATION

The present disclosure claims the benefit of Japanese Patent Application No. 2022-184120 filed on Nov. 17, 2022, with the Japanese Patent Office, the disclosures of which are incorporated herein by reference in its entirety.

BACKGROUND

Field of the Disclosure

Embodiments of the present disclosure relate to the art of a differential gear unit in which a differential mechanism is held in a casing as an input element, and the differential mechanism outputs power therefrom.

Discussion of the Related Art

A differential gear unit of this kind is widely adopted as a final speed reducer that transmits torque to left and right drive wheels of a vehicle while allowing those wheels to rotate in a differential manner. JP-A-2018-91449 describes an example of the differential gear unit having a differential structure. In the differential gear unit described in JP-A-2018-91449, a differential case having a flange portion extending outwardly serves as an input element. A ring gear (differential drive gear) mounted on the differential case is provided with a flange portion extending inwardly to come into contact with the flange portion of the differential case. The ring gear is fixed to the differential case by fastening the flange portions contacting each other by bolts penetrating through the flange portions. In the differential gear unit described in JP-A-2018-91449, contact surfaces of the ring gear and the differential case are tapered to prevent loosening of the bolts.

The differential gear unit described in JP-A-2018-91449 may be employed as a final reduction unit of automobiles. In this case, however, a large torque would act between the ring gear and the differential case thereby generating vibrations. Therefore, as described in JP-A-2018-91449, it is desirable not only to prevent loosening of the bolts, but also to sufficiently increase the strength. In particular, in an electric vehicle (EV) or a hybrid vehicle (HEV, PHEV) using an electric motor as a prime mover, a torque acting thereon including inertia torque increases significantly instantaneously. Therefore, it is required to ensure sufficient strength so as to withstand the momentary maximum torque. However, in order to ensure a strength of the differential gear unit sufficiently to withstand the maximum torque, the size of the differential gear unit will be increased, and the differential gear unit may not be fitted easily into a vehicle. For example, application of such excessive torque to the differential gear unit may be prevented by arranging an additional torque limiter. In this case, although the strength of the differential gear unit does not have to be increased, the size of the differential gear unit has to be increased. The differential gear unit may be combined with a transmission to form a transaxle as a final speed reducer of a vehicle. For this purpose, it is strongly required to downsize the differential gear unit and to reduce a weight thereof, without reducing the durability.

SUMMARY

Aspects of embodiments of the present disclosure have been conceived noting the foregoing technical problems, and it is therefore an object of embodiments of the present disclosure to provide a downsized differential gear unit designed to prevent transmission of an excessive torque.

In order to achieve the above-explained objective, according to the exemplary embodiment of the present disclosure, there is provided a differential gear unit, comprising: a differential mechanism held in a casing; a ring gear that transmits torque delivered thereto from outside, and that is mounted on the casing in a rotatable manner while being allowed to reciprocate in a direction along a rotational center axis of the ring gear; a friction mechanism that is arranged between the ring gear and the casing to establish a frictional force for preventing relative rotation between the ring gear and the casing; and an elastic member that pushes the ring gear in a direction to increase the frictional force established by the friction mechanism. In the differential gear unit, a torque possible to be transmitted between the ring gear and the casing is set to a torque governed by a pushing force of the elastic member and the frictional force of the friction mechanism.

In a non-limiting embodiment, the ring gear may include a helical gear that establishes a thrust force based on the torque delivered thereto from outside, in a direction to reduce a contact pressure of the friction mechanism by compressing the elastic member.

In a non-limiting embodiment, the friction mechanism may comprise a first tapered surface and a second tapered surface that are in contact with each other to establish the frictional force.

In a non-limiting embodiment, the differential gear unit may further comprise an annular member that is arranged adjacent to and coaxially with the ring gear, and that is rotated integrally with the casing. For example, the first tapered surface may be formed on the ring gear, and the second tapered surface may be formed on the annular member.

In a non-limiting embodiment, the differential mechanism may comprise: a pair of side gears arranged coaxially in the casing while being opposed to each other; a pinion gear that is interposed rotatably between the side gears to be meshed with the side gears while being allowed to revolve around the rotational center axis of the ring gear; and a pinion shaft that is engaged with the casing while supporting the pinion gear in a rotatable manner. In addition, the annular member may be connected to the pinion shaft.

Thus, in the differential gear unit according to the exemplary embodiment of the present disclosure, the ring gear serving as the input element is attached or connected to the casing through the friction mechanism. Therefore, a conventional joint means such as a set bolt may be omitted to downsize the differential gear unit and to reduce a weight of the differential gear unit. Moreover, the number of manufacturing steps may be reduced. Further, the friction mechanism transmits a torque in accordance with the contact pressure established by the pushing force of the elastic member, and starts slipping when a torque greater than a maximum transmittable torque is applied thereto. That is, the friction mechanism serves as a torque limiter. Thus, the friction mechanism serves not only as a joint member connecting the ring gear to the casing but also as a torque limiter. According to the exemplary embodiment of the present disclosure, therefore, the differential gear unit will not be subjected to an excessive torque. In addition, it is not necessary to enhance the strength of the differential gear unit by increasing the size of the differential gear unit. In other words, the differential gear unit may be downsized.

As described, helical gear may be employed as the ring gear so that the thrust force is applied to the friction mechanism or the elastic member in accordance with the torque applied to the ring gear. According to the exemplary embodiment of the present disclosure, therefore, an excessive torque acts as a thrust force or a pushing force for compressing the elastic member to reduce a contact pressure at the friction mechanism. For this reason, transmission of the excessive torque may be interrupted certainly.

As also described, the friction mechanism comprises the tapered surfaces, and the second tapered surface may be formed on the annular member. According to the exemplary embodiment of the present disclosure, therefore, the elastic force of the elastic member for establishing a required frictional force may be reduced. For this reason, the differential gear unit may be downsized, and a weight of the differential gear unit may be reduced.

As also described, the annular member of the friction mechanism may be connected to the pinion shaft so that the torque may be transmitted from the ring gear to the differential mechanism without passing through the casing. According to the exemplary embodiment of the present disclosure, therefore, the number of parts of the differential gear unit may be reduced so that the structure of the differential gear unit is simplified. For this reason, the differential gear unit may be downsized, and a weight of the differential gear unit may be reduced.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
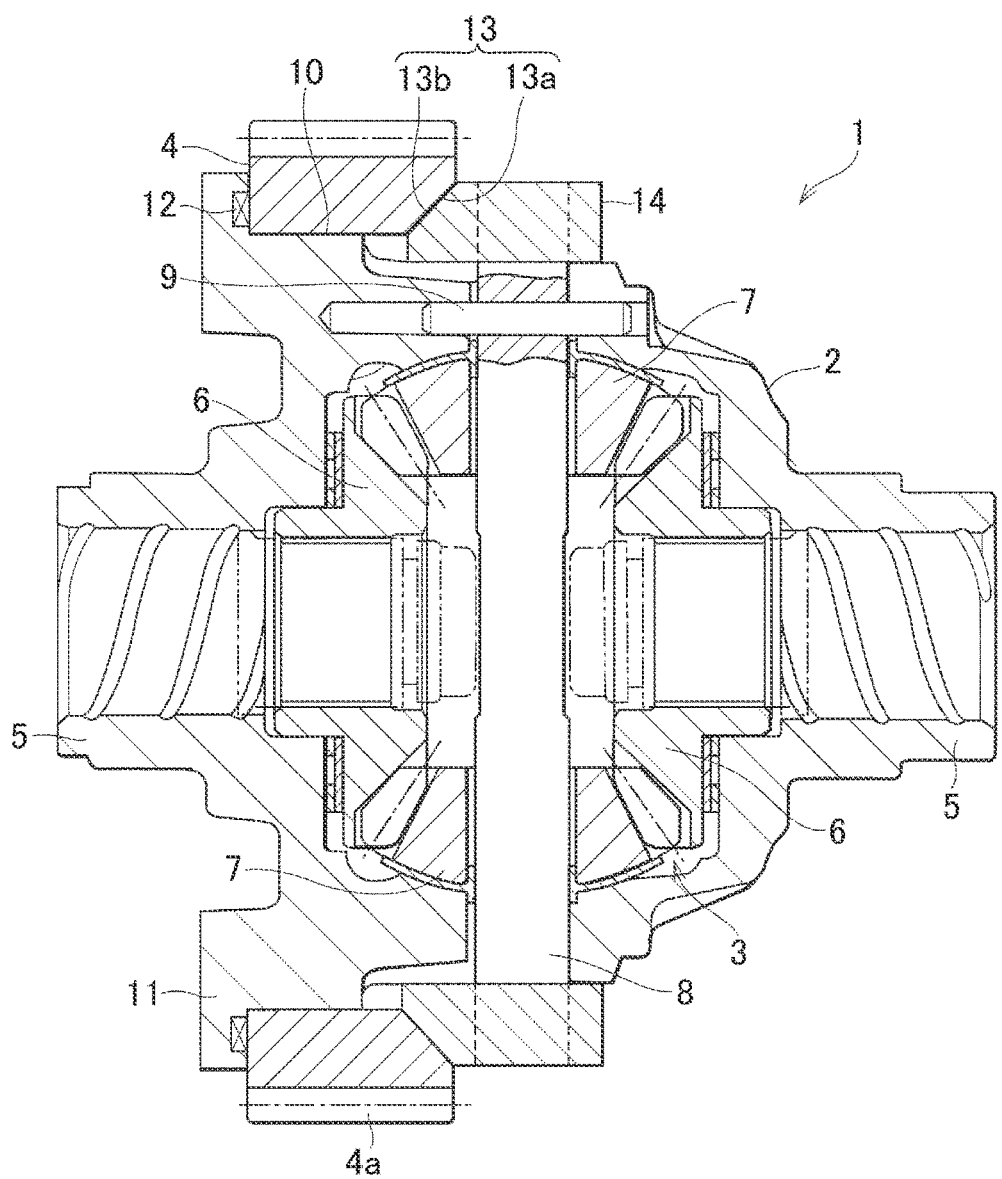
FIG. 1 is a cross-sectional view showing a structure of the differential gear unit according to the exemplary embodiment of the present disclosure.

Turning now to FIG. 1, there is shown a cross-sectional view of a differential gear unit 1 according to the exemplary embodiment of the present disclosure. In the differential gear unit 1, a differential mechanism 3 is held in a casing (hereinafter, referred to as the differential case) 2, and the ring gear 4 to which a torque is delivered from outside is supported by the differential case 2. Therefore, as the conventional differential gear units, the torque is delivered bi-directionally from the differential mechanism 3. Specifically, the differential case 2 is a hollow frame member (i.e., a frame structure) having an opening for assembly and delivery of lubricating oil, and cylindrical bosses 5 protrude coaxially from the right and left sides of the differential case 2 in FIG. 1.

Here will be explained the differential mechanism 3 held in the differential case 2. In the differential mechanism 3, a right side gear 6 and a left side gear 6 each of which is a bevel gear are held coaxially with the bosses 5. For example, given that the differential gear unit 1 is arranged in a vehicle, each of the side gears 6 is individually connected to a drive shaft (not shown) to deliver a drive torque to the drive shaft. That is, the side gear 6 serves as an output element of the differential mechanism 3. A pair of pinion gears 7 are arranged at symmetrical positions across a common center axis of the bosses 5 (or the side gears 6) to be meshed with the side gears 6. As the side gears 6, the pinion gears 7 are also bevel gears, and the pinion gears 7 are rotatably held by the pinion shaft 8 penetrating therethrough along a common rotational center axis of the pinion gears 7.

Specifically, the pinion shaft 8 penetrates through the differential case 2, and is fixed to the differential case 2 by a pinion pin 9. The pinion pin 9 is inserted into a pin hole penetrating through a portion of the pinion shaft 8 inserted into the differential case 2 in the diametrical direction of the pinion shaft 8 so that the pinion pin 9 is engaged not only with the pinion shaft 8 but also with the differential case 2. Therefore, the pinion gears 7 are allowed to rotate around the pinion shaft 8 and revolve together with the differential case 2. As described above, the fundamental structure of the differential mechanism 3 is similar to those of the conventional differential mechanisms known in the art. Although not especially described, a bearing member may be disposed in sliding sites e.g., between each of the gears 6 and 7 and the differential case 2.

The embodiment of the present disclosure is characterized by the mechanism for delivering the torque to the differential case 2 from outside. In order to transmit torque to the differential case 2, a ring gear 4 as an external gear having teeth 4a formed on an outer peripheral surface thereof is arranged in the differential gear unit 1. A cylindrical pedestal 10 is formed on an outer periphery of the differential case 2 to extend radially outer side of the pinion shaft 8 along the center axis of the side gear 6, and a flange 11 expands radially outwardly from one end of the pedestal 10 opposite to the pinion shaft 8. Specifically, an outer diameter of the pedestal 10 is substantially equal to an inner diameter of the ring gear 4 so that the ring gear 4 is fitted onto the pedestal 10 in a rotatable manner while being allowed to reciprocate in the axial direction. In addition, an elastic member 12 is disposed between the flange 11 and the ring gear 4 to push the ring gear 4 toward the pinion shaft 8. For example, the elastic member 12 may be a spring such as a coil spring and a diaphragm spring, or a so-called volume elastic body whose volume is changed by elasticity.

Figure 2:
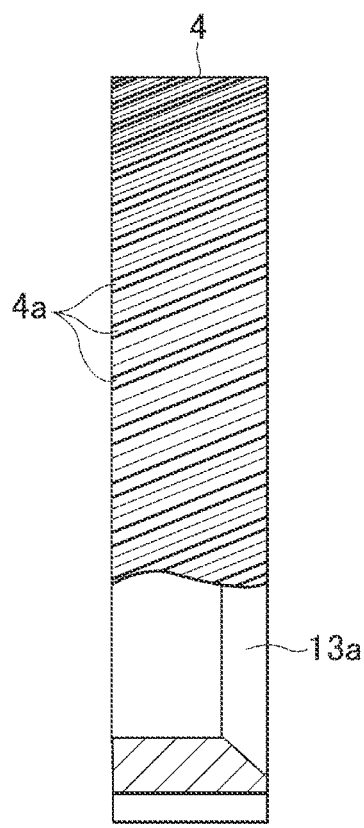
FIG. 2 is a partial cross-sectional view showing a cross-section of the ring gear.

As schematically illustrated in FIG. 2, the ring gear 4 is a helical gear in which the teeth 4a are set at an angle with respect to the rotational center axis. Therefore, an axial force (i.e., a thrust force) acts on the ring gear 4 when transmitting torque between the ring gear 4 and another gear (not shown) meshing therewith. In the embodiment shown in FIG. 1, specifically, the thrust force is established in a direction to compress the elastic member 12 by applying the torque to the ring gear 4 in a direction to rotate the ring gear 4 in the forward direction (i.e., in a direction to propel the vehicle in the forward direction).

As described above, the ring gear 4 is not directly fixed to the differential case 2. That is, the ring gear 4 is fixed to the differential case 2 without using a fixing member such as a set bolt. Therefore, the structure of the differential gear unit 1 may be simplified and the number of manufacturing steps may be reduced. In the differential gear unit 1, a mechanism serving as a torque limiter is employed to transmit torque from the ring gear 4 to the differential case 2 so that the torque transmitted from the ring gear 4 to the differential case 2 is limited by the torque limiter.

Figure 3:
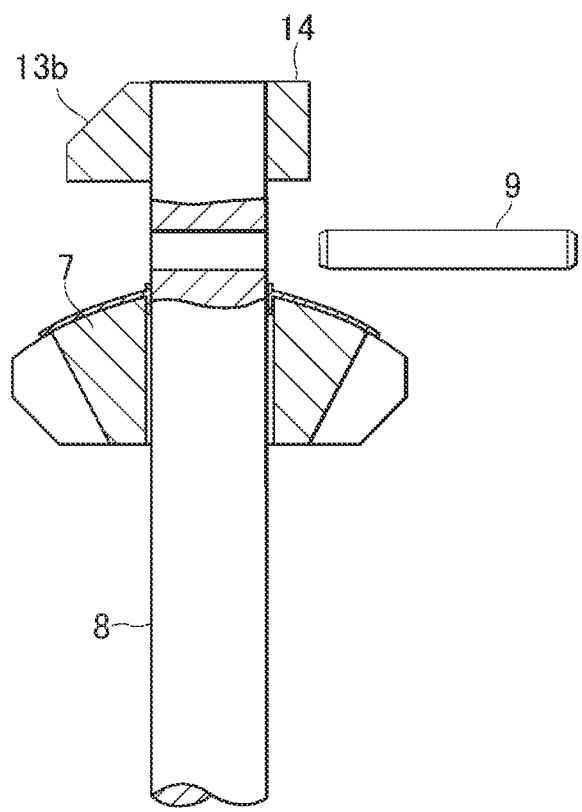
FIG. 3 is a partial cross-sectional view showing cross-section of a joint section between the annular member and the pinion shaft.

As shown in FIGS. 1 and 2, a tapered surface 13a as a frictional surface is formed on an inner periphery of the ring gear 4 on the opposite side of the elastic member 12. Specifically, the tapered surface 13a is formed such that an inner diameter of the ring gear 4 is increased gradually from a portion near the center of width of the ring gear 4 toward one of side surfaces on the opposite side of the elastic member 12. An annular member 14 having a tapered surface 13b that is mated to the tapered surface 13a is fitted into the differential case 2 on the radially outer side of the pinion shaft 8. Each end of the pinion shaft 8 is individually inserted into the annular member 14 to be integrated therewith (cf. FIG. 3). That is, the ring gear 4 is connected to the differential case 2 through the tapered surface 13a and 13b, the annular member 14, and the pinion shaft 8.

Thus, the ring gear 4 is pushed rightward in FIG. 1 by the elastic member 12, and the annular member 14 is fixed to the differential case 2 through the pinion shaft 8. Therefore, the tapered surface 13a of the ring gear 4 is brought into frictional contact with the tapered surface 13b of the annular member 14. That is, the torque is transmitted between the ring gear 4 and the annular member 14 (or the differential case 2) in accordance with a contact pressure (or a frictional force) acting between the tapered surface 13a of the ring gear 4 and the tapered surface 13b of the annular member 14. Accordingly, the tapered surface 13a and the tapered surface 13b serve as a friction mechanism 13.

Thus, the torque is frictionally transmitted between the tapered surface 13a and the tapered surface 13b, and the frictional force acting between the tapered surface 13a and the tapered surface 13b is governed by the elastic force (or the pushing force) of the elastic member 12 and the thrust force (acting in the direction to reduce the contact pressure) resulting from transmitting the torque through the ring gear 4. That is, magnitude of the torque that transmitted through the friction mechanism 13 may be changed arbitrarily by adjusting the elastic force of the elastic member 12. When a torque larger than the maximum torque transmittable by the friction mechanism 13 is applied to the ring gear 4, the friction mechanism 13 starts slipping thereby limiting the torque transmission therethrough. Thus, the friction mechanism 13 serves not only as a joint member connecting the ring gear 4 to the differential case 2 but also as a torque limiter.

In the differential gear unit 1 according to the exemplary embodiment of the present disclosure, the torque applied to the ring gear 4 from outside is transmitted to the annular member 14 through the friction mechanism 13 arranged therebetween. As described, the annular member 14 is connected to the pinion shaft 8 and the pinion shaft 8 is inserted into the differential case 2 while being fixed thereto by the pinion pin 9 so that the torque applied to the ring gear 4 is transmitted to the differential case 2. Consequently, the differential case 2 is rotated integrally with the ring gear 4. The pinion gears 7 held in the differential case 2 are also rotated in this situation so that the torque is distributed from the pinion gears 7 to the right side gear 6 and the left side gear 6. As a result, rotary shafts such as drive shafts (not shown) connected individually to the side gears 6 are rotated by the torque of the side gears 6. In this situation, since each of the pinion gears 7 are allowed to rotate around the pinion shaft 8 independently, the right side gear 6 and the left side gear 6 are rotated in a differential manner.

For example, the differential gear unit 1 may be incorporated into a transaxle (not shown) of a vehicle to form a drive unit. In this case, an input torque to the differential gear unit 1 may be increased instantaneously when an accelerator pedal is depressed abruptly or when idling drive wheels grip road surface again. When the torque delivered to the differential gear unit 1 through the ring gear 4 exceeds the maximum torque transmittable by the friction mechanism 13, the tapered surface 13a and the tapered surface 13b start slipping to limit the torque transmission.

Thus, in the differential gear unit 1 according to the exemplary embodiment of the present disclosure, an excessive torque greater than a torque corresponding to the designed strengths of the differential case 2 and the differential mechanism 3 held therein will not be applied to the differential case 2 and the differential mechanism 3. According to the exemplary embodiment of the present disclosure, therefore, damage of the differential gear unit 1 may be limited. In addition, it is not necessary to enhance the strength of the differential gear unit 1 by increasing the size of the differential gear unit 1. In other words, the differential gear unit 1 may be downsized.

In the foregoing embodiment, the annular member 14 is connected to the pinion shaft 8 to be integrated with the differential case 2. Instead, according to the present disclosure, the annular member may also be fixed to the differential case. In addition, one of the tapered surfaces of the friction mechanism may be formed on the differential case instead of the annular member. In this case, the annular member may be omitted. Further, configurations of the tapered surfaces of the friction mechanism may be altered arbitrarily.

What is claimed is:

1. A differential gear unit, comprising:
a differential mechanism held in a casing;
a ring gear that transmits torque delivered thereto from outside, and that is mounted on the casing in a rotatable manner while being allowed to reciprocate in a direction along a rotational center axis of the ring gear;
a friction mechanism that is arranged between the ring gear and the casing to establish a frictional force for preventing relative rotation between the ring gear and the casing; and
an elastic member that pushes the ring gear in a direction to increase the frictional force established by the friction mechanism,
wherein a torque possible to be transmitted between the ring gear and the casing is set to a torque governed by a pushing force of the elastic member and the frictional force of the friction mechanism.

2. The differential gear unit as claimed in claim 1, wherein the ring gear includes a helical gear that establishes a thrust force based on the torque delivered thereto from outside, in a direction to reduce a contact pressure of the friction mechanism by compressing the elastic member.

3. The differential gear unit as claimed in claim 1, wherein the friction mechanism comprises a first tapered surface and a second tapered surface that are in contact with each other to establish the frictional force.

4. The differential gear unit as claimed in claim 2, wherein the friction mechanism comprises a first tapered surface and a second tapered surface that are in contact with each other to establish the frictional force.

5. The differential gear unit as claimed in claim 3, further comprising:

an annular member that is arranged adjacent to and coaxially with the ring gear, and that is rotated integrally with the casing, wherein the first tapered surface is formed on the ring gear, and the second tapered surface is formed on the annular member.

6. The differential gear unit as claimed in claim 4, further comprising:

an annular member that is arranged adjacent to and coaxially with the ring gear, and that is rotated integrally with the casing, wherein the first tapered surface is formed on the ring gear, and the second tapered surface is formed on the annular member.

7. The differential gear unit as claimed in claim 5, wherein the differential mechanism comprises:

a pair of side gears arranged coaxially in the casing while being opposed to each other;

a pinion gear that is interposed rotatably between the side gears to be meshed with the side gears while being allowed to revolve around the rotational center axis of the ring gear; and a pinion shaft that is engaged with the casing while supporting the pinion gear in a rotatable manner, and the annular member is connected to the pinion shaft.

8. The differential gear unit as claimed in claim 6, wherein the differential mechanism comprises a pair of side gears arranged coaxially in the casing while being opposed to each other, a pinion gear that is interposed rotatably between the side gears to be meshed with the side gears while being allowed to revolve around the rotational center axis of the ring gear, and a pinion shaft that is engaged with the casing while supporting the pinion gear in a rotatable manner, and the annular member is connected to the pinion shaft.

\* \* \* \* \*